(12) United States Patent
Kwon et al.

(10) Patent No.: US 7,531,924 B2
(45) Date of Patent: May 12, 2009

(54) COOLING AND SUPPORTING APPARATUS FOR CURRENT LEADS OF SUPERCONDUCTING ROTATING MACHINE

(75) Inventors: Woon-sik Kwon, Jinju-Si (KR); Yeong-Chun Kim, Changwon-Si (KR); Tae-sun Moon, Book-Gu (KR); Heui-joo Park, Gimhae-Si (KR)

(73) Assignee: Doosan Heavy Industries and Construction Co., Ltd., Seoul (KR)

( * ) Notice: Subject to any disclaimer, the term of this patent is extended or adjusted under 35 U.S.C. 154(b) by 97 days.

(21) Appl. No.: 11/620,815

(22) Filed: Jan. 8, 2007

(65) Prior Publication Data

US 2008/0110664 A1 May 15, 2008

(30) Foreign Application Priority Data

Nov. 15, 2006 (KR) ...................... 10-2006-0112549

(51) Int. Cl.
*H02K 9/00* (2006.01)
*H02K 1/32* (2006.01)
*H02K 3/24* (2006.01)
*H02K 5/18* (2006.01)
*H02K 5/20* (2006.01)
*H02K 1/22* (2006.01)

(52) U.S. Cl. ............................ 310/52; 310/64; 310/261

(58) Field of Classification Search ................ 336/192; 310/52, 54, 261, 64; 505/890–892; 62/50.1
See application file for complete search history.

(56) References Cited

U.S. PATENT DOCUMENTS

| | | | | |
|---|---|---|---|---|
| 2,497,516 A * | 2/1950 | Phelps | .......................... | 336/62 |
| 2,663,827 A * | 12/1953 | Baker | .......................... | 336/62 |
| 2,836,802 A * | 5/1958 | Gelpi et al. | .................... | 336/62 |
| 2,908,486 A * | 10/1959 | Thornburg | .................... | 165/89 |
| 3,559,126 A * | 1/1971 | Drautman | .................... | 335/216 |
| 4,174,510 A * | 11/1979 | Smith et al. | .................... | 336/62 |
| 4,516,044 A * | 5/1985 | Bone | .......................... | 310/64 |
| 4,808,954 A * | 2/1989 | Ito | .............................. | 335/216 |
| 5,548,168 A | 8/1996 | Laskaris et al. | | |
| 5,683,059 A * | 11/1997 | Hara et al. | ................ | 242/602.3 |
| 5,799,726 A * | 9/1998 | Frank | .......................... | 165/156 |
| 6,220,344 B1 * | 4/2001 | Beykirch et al. | ............ | 165/156 |
| 6,222,289 B1 * | 4/2001 | Adames | ....................... | 310/54 |
| 6,888,271 B2 * | 5/2005 | York | ......................... | 310/49 A |
| 7,009,317 B2 * | 3/2006 | Cronin et al. | .................. | 310/54 |
| 2005/0145408 A1 * | 7/2005 | Hess | .......................... | 174/52.1 |

* cited by examiner

*Primary Examiner*—Elvin G Enad
*Assistant Examiner*—Alexander Talpalatskiy
(74) *Attorney, Agent, or Firm*—Duane Morris LLP

(57) ABSTRACT

Disclosed is a cooling and supporting apparatus for current leads of a superconducting rotating machine. The cooling and supporting apparatus is installed on the current leads, and includes an inner tube provided with a spiral-shaped groove formed in the outer surface thereof and an outer tube provided with a spiral-shaped groove formed in the inner surface thereof, thus preventing heat transferred through the current leads from being directly transferred to a superconducting coil for preventing the deformation of the superconducting coil, and allowing the outer tube from fixedly surrounding the whole current leads for preventing the breakage of the current leads due to centrifugal force of a rotor.

4 Claims, 4 Drawing Sheets

COOLING AND SUPPORTING APPARATUS FOR CURRENT LEADS OF SUPERCONDUCTING ROTATING MACHINE

BACKGROUND OF THE INVENTION

1. Field of the Invention

The present invention relates to a cooling and supporting apparatus for current leads of a superconducting rotating machine, and more particularly to a cooling and supporting apparatus for current leads of a superconducting rotating machine, which is installed on the current leads, and includes an inner tube provided with a spiral-shaped groove formed in the outer surface thereof and an outer tube provided with a spiral-shaped groove formed in the inner surface thereof.

2. Description of the Related Art

Generally, a superconducting rotating machine includes an electric generator and an electric motor.

Current leads are installed between a field coil, which is cooled to a cryogenic temperature, of a superconducting rotating machine and a current terminal, which is installed on an outer tube of a rotor at a normal temperature, and serve to transport current. Since these current leads are connected between the normal temperature and the cryogenic temperature and transport current, heat conducted from the normal temperature through the current leads and heat due to resistance of the current leads are generated, and are transferred to the superconducting field coil, thus causing the deformation of the field coil. Further, while the rotor is rotated at a high speed, centrifugal force is applied to the current leads, thus causing the breakage of the current leads.

Accordingly, various methods for cooling the above current leads have been developed by relevant companies. However, the above problems are not solved yet. Particularly, there is no method for preventing the breakage of the current leads due to centrifugal force.

SUMMARY OF THE INVENTION

Therefore, the present invention has been made in view of the above problems, and it is an object of the present invention to provide a cooling and supporting apparatus for current leads of a superconducting rotating machine, which is installed on the current leads, and includes an inner tube provided with a spiral-shaped groove formed in the outer surface thereof and an outer tube provided with a spiral-shaped groove formed in the inner surface thereof so as to cool the current leads, thereby preventing heat transferred through the current leads from being directly transferred to a superconducting coil for preventing the deformation of the superconducting coil, and allowing the outer tube from fixedly surrounding the whole current leads for preventing the breakage of the current leads due to centrifugal force of a rotor.

In accordance with the present invention, the above and other objects can be accomplished by the provision of a cooling and supporting apparatus for current leads of a superconducting rotating machine comprising an inner tube made of aluminum and provided with a spiral-shaped groove formed in the outer surface thereof; and an outer tube made of aluminum and provided with a spiral-shaped groove formed in the inner surface thereof, wherein each of the inner and outer tubes is obtained by fixedly connecting two portions having a semicircular section by bolt connecting units.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
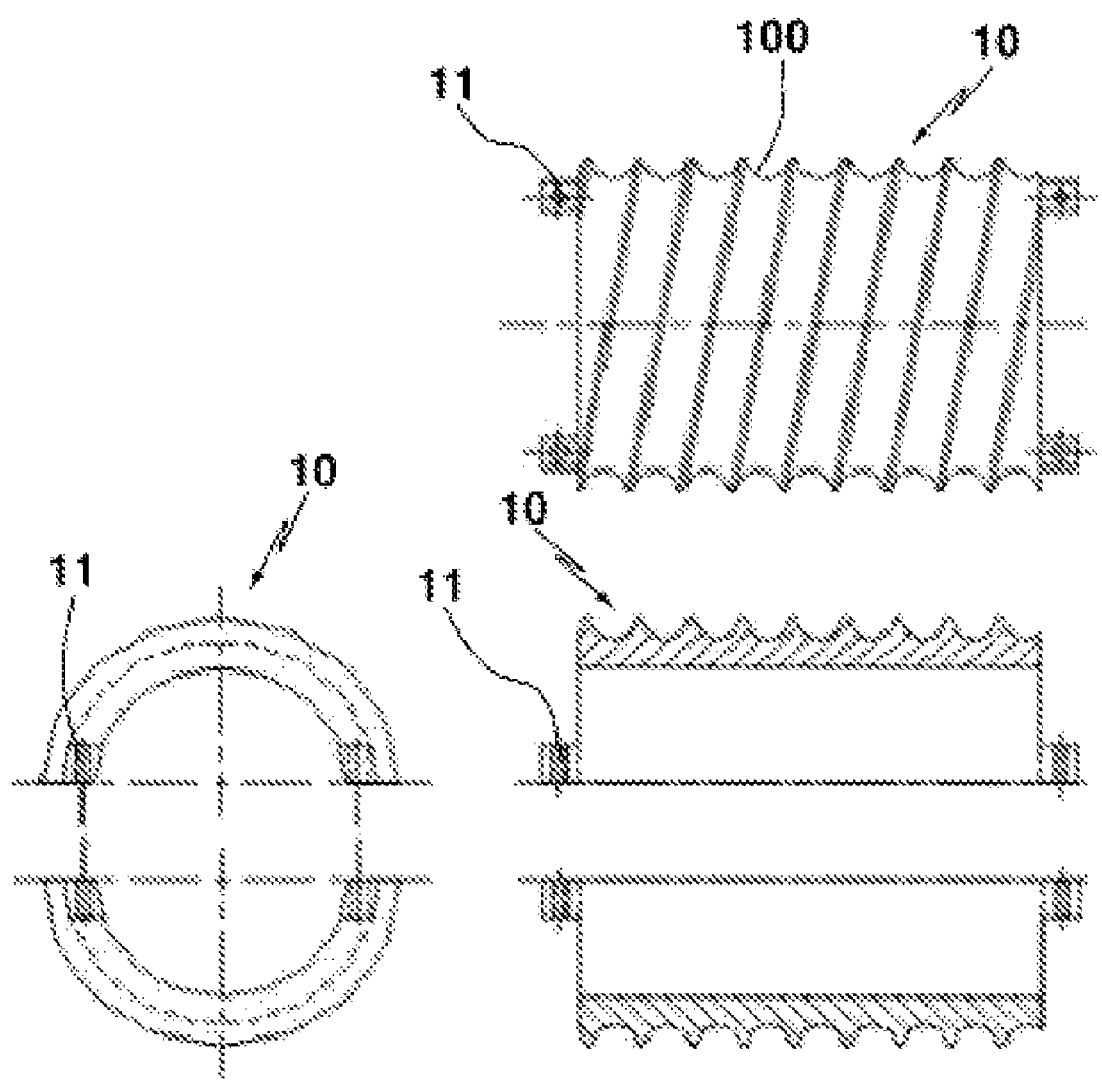
FIG. 1 is a schematic view of an inner tube of a cooling and supporting apparatus of current leads for a superconducting rotating machine in accordance with the present invention.
Figure 2:
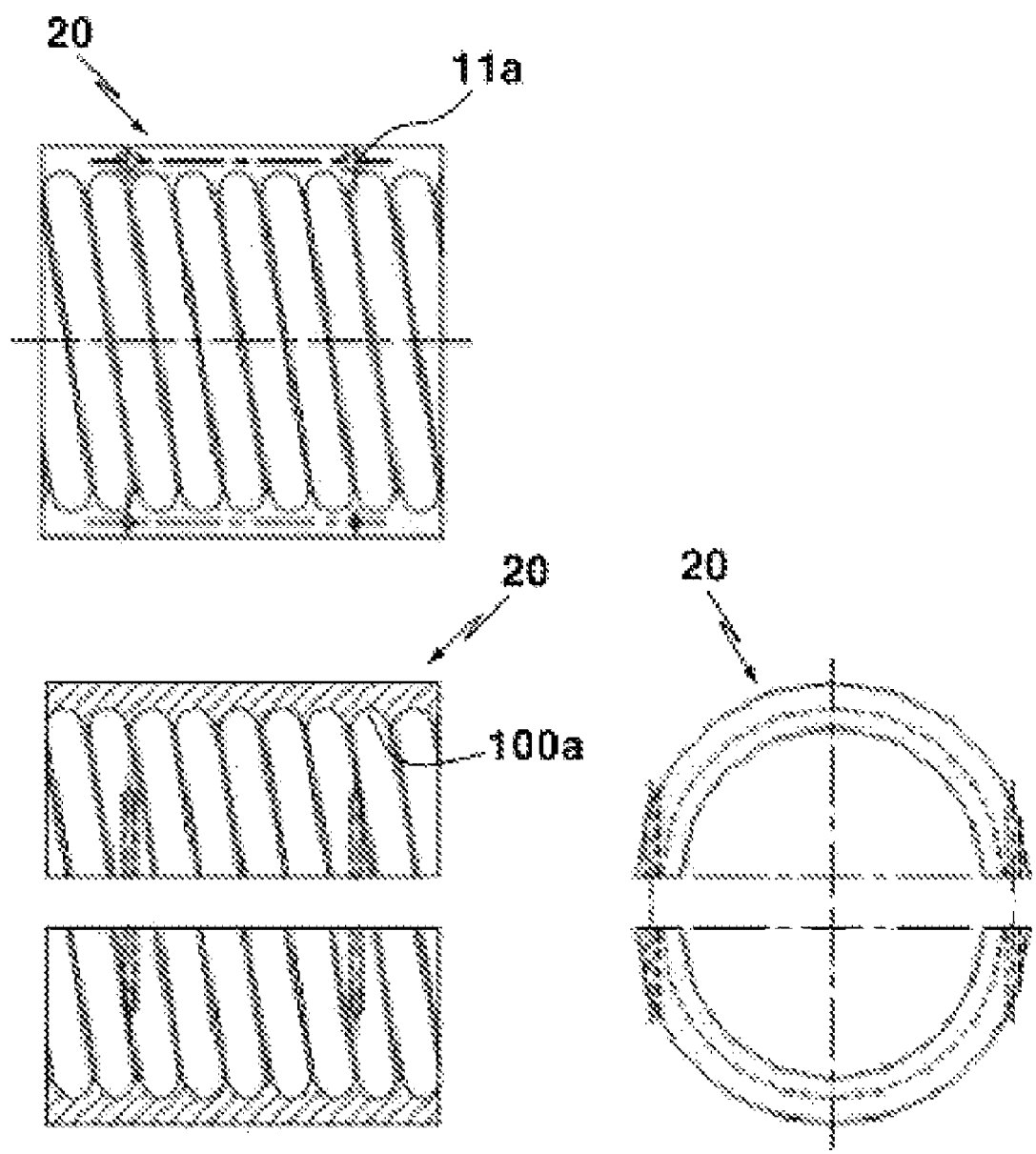
FIG. 2 is a schematic view of an outer tube of the cooling and supporting apparatus in accordance with the present invention.
Figure 3:
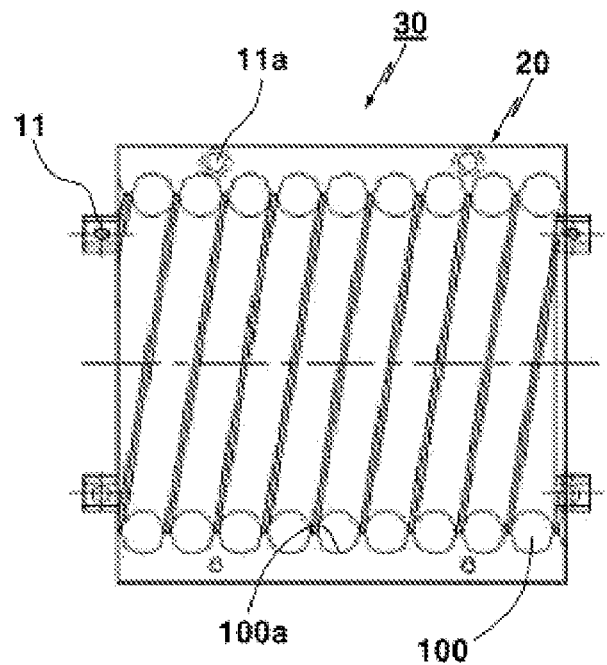
FIG. 3 is a schematic view of the cooling and supporting apparatus in a state in which the inner and outer tubes of FIGS. 1 and 2 are connected.

FIG. 1 is a schematic view of an inner tube of a cooling and supporting apparatus of current leads for a superconducting rotating machine in accordance with the present invention, FIG. 2 is a schematic view of an outer tube of the cooling and supporting apparatus in accordance with the present invention, and FIG. 3 is a schematic view of the cooling and supporting apparatus in a state in which the inner and outer tubes of FIGS. 1 and 2 are connected.

As shown in FIGS. 1 and 2, a cooling and supporting apparatus of current leads for a superconducting rotating machine in accordance with the present invention includes an inner tube 10 provided with a groove 100 having a spiral shape formed in the outer surface thereof, and an outer tube 20 provided with a groove 100a having a spiral shape formed in the inner surface thereof. Each of the inner and outer tubes 10 and 20 is obtained by fixedly connecting two portions having a semicircular section using bolt connecting units 11 or 11a, and is made of aluminum, thus having a high heat transfer rate and a lightweight.

The inner tube 10 is connected to a cryogenic surface, and is cooled to a cryogenic temperature by heat transfer. Two current leads are wound on the spiral groove 100 formed in the outer surface of the inner tube 10, and are cooled by heat transfer.

Further, the outer tube 20 is provided with the spiral groove 100a formed in the inner surface thereof, and fixedly surrounds the whole current leads 80 wound on the inner tube 10.

The outer tube 20 prevents the current leads 80 from deviating from their original positions due to centrifugal force generated from the rotation of a rotor, thus preventing the current leads 80 from being deformed or damaged.

When the inner tube 10 and the outer tube 20 are connected, the outer tube 20 is cooled to a cryogenic temperature through a contact surface with the inner tube 10, and thus also serves to cool the current leads 80 by heat transfer.

FIG. 3 illustrates the cooling and supporting apparatus 30 obtained by connecting the inner tube 10 and the outer tube 20. The current leads 80 are wound on the spiral grooves 100 and 100a between the inner tube 10 and the outer tube 20.

Figure 4:
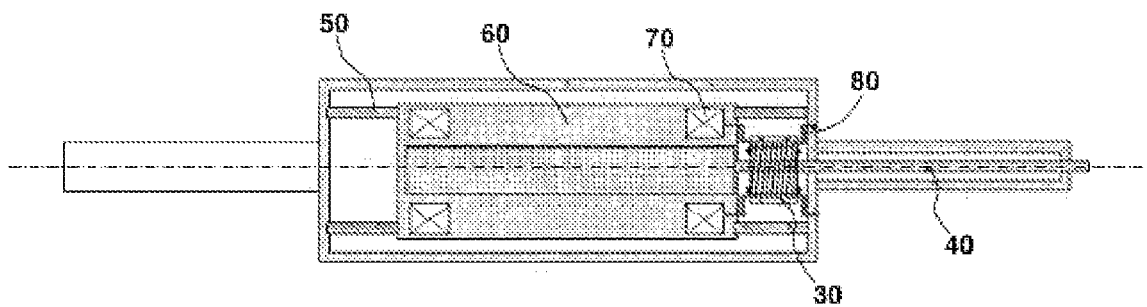
FIG. 4 is a sectional view of a cooling and supporting apparatus of current leads for a superconducting rotating machine in accordance with one embodiment of the present invention.

FIG. 4 illustrates a cooling and supporting apparatus 30 in accordance with one embodiment of the present invention, which is applied to a superconducting rotor. The cooling and supporting apparatus 30 is connected to a refrigerant line 40, through which a refrigerant is supplied to the superconducting rotor. The cooling and supporting apparatus 30 is cooled to a cryogenic temperature by heat transfer through the refrigerant line 40, and the current leads 80 wound in the cooling and supporting apparatus 30 is cooled by heat conduction.

Figure 5:
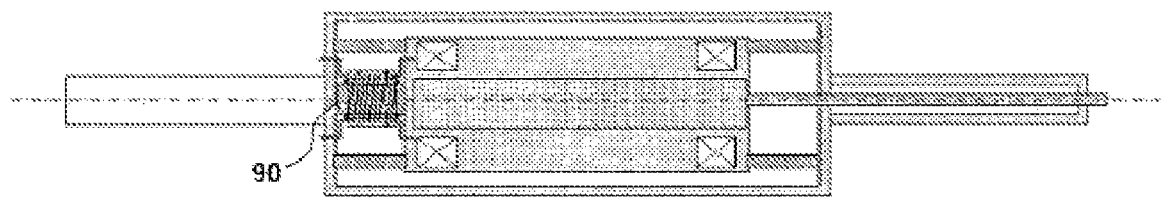
FIG. 5 is a sectional view of a cooling and supporting apparatus of current leads for a superconducting rotating machine in accordance with another embodiment of the present invention.

FIG. 5 illustrates a cooling and supporting apparatus 30 in accordance with another embodiment of the present invention. In case that it is difficult to install the cooling and supporting apparatus 30 on a refrigerant line, a connector 90 is installed on a side surface of a superconducting field coil support structure 60 opposite to the refrigerant line and the cooling and supporting apparatus 30 is connected to the connector 90. Thus, the cooling and supporting apparatus 30 is cooled by heat conduction from the superconducting field coil support structure 60, which has been cooled to a cryogenic temperature, and the current leads, which are wound in the cooling and supporting apparatus 30 is cooled to the cryogenic temperature by heat conduction.

The superconducting rotating machine of the present invention includes an electric generator and an electric motor, and has the same constitution and operation as those of the conventional superconducting rotating machine. Current (+), supplied from a power supply, flows to the current leads 80, the field coil 70, and the current leads 80 through a current terminal, and then flows to the power supply (−) through the current terminal.

In the above and other embodiments, heat supplied through the currents leads is cooled by the cooling and supporting apparatus, and thus it is possible to minimize heat, which is directly transferred to the superconducting field coil 70.

As apparent from the above description, the present invention provides a cooling and supporting apparatus of current leads for a superconducting rotating machine, which cools heat transferred through the current leads and heat generated due to resistance of the current leads, thus minimizing heat directly transferred to a superconducting coil for preventing the deformation of the superconducting coil, and preventing the current leads from being damaged by centrifugal force when a rotor is rotated at a high speed. Further, the cooling and supporting apparatus of the present invention surrounds the current leads using spiral grooves formed in the outer and inner surfaces of inner and outer tubes, having a reduced length in an axial direction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cooling and supporting apparatus for current leads of a superconducting rotating machine comprising:
    an inner tube made of aluminum and provided with a spiral-shaped groove formed in the outer surface thereof, the current leads are wound on the spiral-shaped grooves of the inner tubes and are cooled by heat conduction; and
    an outer tube made of aluminum and provided with a spiral-shaped groove formed in the inner surface thereof, the spiral-shaped groove of the outer tube sized to maintain the current leads in their position during the rotation of the superconducting rotating machine,
    wherein each of the inner and outer tubes is obtained by fixedly connecting two portions having a semicircular section by bolt connecting units.

2. The cooling and supporting apparatus according to claim 1, wherein the outer tube surrounds the whole current leads wound on the spiral-shaped groove of the inner tube so that the current leads are cooled by heat conduction.

3. The cooling and supporting apparatus according to claim 1, wherein the inner tube is in contact with a cooling surface.

4. The cooling and supporting apparatus according to claim 3, wherein the cooling surface is a refrigeration line disposed through a center of the inner tube.

* * * * *